US012206836B1

United States Patent
Philipp et al.

(10) Patent No.: US 12,206,836 B1
(45) Date of Patent: Jan. 21, 2025

(54) POLARIZATION-BASED OPTICAL ARRANGEMENT WITH VIRTUAL DISPLAYS AND MULTIPLE FIELDS OF VIEW

(71) Applicant: GM GLOBAL TECHNOLOGY OPERATIONS LLC, Detroit, MI (US)

(72) Inventors: Tzvi Philipp, Bet Shemesh (IL); Manoj Sharma, Troy, MI (US); Joseph F. Szczerba, Grand Blanc, MI (US); Thomas A. Seder, Fraser, MI (US)

(73) Assignee: GM Global Technology Operations LLC, Detroit, MI (US)

(*) Notice: Subject to any disclaimer, the term of this patent is extended or adjusted under 35 U.S.C. 154(b) by 84 days.

(21) Appl. No.: 18/343,894

(22) Filed: Jun. 29, 2023

(51) Int. Cl.
*H04N 13/351* (2018.01)
*B60K 35/00* (2006.01)
*G02B 5/30* (2006.01)
*G02B 27/28* (2006.01)
*B60K 35/22* (2024.01)
*G02B 27/18* (2006.01)

(52) U.S. Cl.
CPC ............ *H04N 13/351* (2018.05); *B60K 35/00* (2013.01); *G02B 5/3083* (2013.01); *G02B 27/283* (2013.01); *B60K 35/22* (2024.01); *B60K 2360/1526* (2024.01); *G02B 27/18* (2013.01)

(58) Field of Classification Search
CPC ...... H04N 13/351; B60K 35/00; B60K 35/22; B60K 2360/1526; G02B 5/3083; G02B 27/18; G02B 27/283
See application file for complete search history.

(56) References Cited

U.S. PATENT DOCUMENTS 7,068,789 B2 * 6/2006 Huitema ............... H04L 67/104
    713/168
7,614,069 B2 * 11/2009 Stone ............... H04N 21/25435
    725/89
7,650,624 B2 * 1/2010 Barsoum ................ H04N 7/081
    725/23

(Continued)

FOREIGN PATENT DOCUMENTS

| CN | 109856808 A | 6/2019 |
| CN | 115933205 A | 4/2023 |
| WO | 2021097149 A1 | 5/2021 |

*Primary Examiner* — Michael B. Pierorazio
(74) *Attorney, Agent, or Firm* — Quinn IP Law

(57) ABSTRACT

An optical arrangement includes at least one pair of displays, each pair having a first display and a second display configured to generate light in a visible spectral range. For each pair of displays, the optical arrangement includes a first polarizer configured to polarize the light incident from the first display, a second polarizer configured to polarize the light incident from the second display. The optical arrangement also includes first and second polarizing beam splitters for each pair of displays. Each polarizing beam splitter is configured to receive the polarized light from the first and second polarizers. Each polarizing beam splitter is also configured to reflect one of an s-polarized component and a p-polarized component of the received polarized light into at least one field of view (FOV) and transmit the other of the s-polarized component and the p-polarized component of the received polarized light into the subject FOV(s).

20 Claims, 5 Drawing Sheets

(56) References Cited

U.S. PATENT DOCUMENTS

| | | | | |
|---|---|---|---|---|
| 7,721,313 B2* | 5/2010 | Barrett | H04N 21/4334 | 725/89 |
| 7,813,822 B1* | 10/2010 | Hoffberg | H04N 7/163 | 381/73.1 |
| 8,032,911 B2* | 10/2011 | Ohkita | H04L 61/5038 | 725/74 |
| 8,121,706 B2* | 2/2012 | Morikawa | H04L 12/2814 | 725/74 |
| 8,949,923 B2* | 2/2015 | Muvavarirwa | H04N 21/4108 | 370/332 |
| 10,197,971 B1* | 2/2019 | Horst | G11C 13/044 | |
| 2003/0056093 A1* | 3/2003 | Huitema | H04L 67/104 | 713/156 |
| 2003/0227680 A1* | 12/2003 | Chen | H04N 9/3105 | 348/E9.027 |
| 2004/0117856 A1* | 6/2004 | Barsoum | G06Q 30/0207 | 348/E7.071 |
| 2005/0216942 A1* | 9/2005 | Barton | H04N 21/6125 | 348/E7.071 |
| 2005/0283815 A1* | 12/2005 | Brooks | H04H 20/78 | 725/127 |
| 2005/0289632 A1* | 12/2005 | Brooks | H04N 7/17309 | 725/127 |
| 2006/0010481 A1* | 1/2006 | Wall | H04N 7/163 | 725/151 |
| 2006/0212197 A1* | 9/2006 | Butler | B60R 11/0235 | 701/1 |
| 2006/0225105 A1* | 10/2006 | Russ | H04N 7/17318 | 348/E7.071 |
| 2007/0050822 A1* | 3/2007 | Stevens | H04N 7/14 | 725/74 |
| 2007/0079341 A1* | 4/2007 | Russ | H04N 21/43615 | 725/89 |
| 2007/0101185 A1* | 5/2007 | Ostrowka | H04N 21/4334 | 714/6.13 |
| 2007/0130601 A1* | 6/2007 | Li | H04L 65/611 | 725/112 |
| 2007/0146880 A1* | 6/2007 | Bleha | G02B 27/145 | 359/468 |
| 2007/0157281 A1* | 7/2007 | Ellis | H04N 21/4147 | 725/74 |
| 2008/0013919 A1* | 1/2008 | Boston | G11B 19/00 | |
| 2008/0022330 A1* | 1/2008 | Barrett | H04N 21/8352 | 725/89 |
| 2008/0022331 A1* | 1/2008 | Barrett | H04N 21/6125 | 725/89 |
| 2008/0022332 A1* | 1/2008 | Barrett | H04N 21/4227 | 725/89 |
| 2008/0155615 A1* | 6/2008 | Craner | H04N 7/17318 | 348/E7.071 |
| 2008/0221734 A1* | 9/2008 | Nagao | G06V 10/56 | 706/20 |
| 2008/0235587 A1* | 9/2008 | Heie | H04N 7/142 | 709/231 |
| 2008/0235733 A1* | 9/2008 | Heie | H04N 21/482 | 725/46 |
| 2009/0162032 A1* | 6/2009 | Patel | H04N 21/8355 | 386/353 |
| 2010/0107186 A1* | 4/2010 | Varriale | H04H 60/23 | 455/410 |
| 2010/0125876 A1* | 5/2010 | Craner | H04N 21/4331 | 725/37 |
| 2010/0263013 A1* | 10/2010 | Asakura | H04N 21/443 | 725/116 |
| 2010/0296487 A1* | 11/2010 | Karaoguz | H04W 36/04 | 370/332 |
| 2010/0313225 A1* | 12/2010 | Cholas | H04N 21/4402 | 725/62 |
| 2010/0313226 A1* | 12/2010 | Cholas | H04N 21/25875 | 725/98 |
| 2011/0066744 A1* | 3/2011 | Del Sordo | H04N 21/4305 | 709/231 |
| 2011/0086619 A1* | 4/2011 | George | H04M 1/72415 | 455/414.1 |
| 2011/0103374 A1* | 5/2011 | Lajoie | H04L 65/612 | 370/352 |
| 2011/0107364 A1* | 5/2011 | Lajoie | H04L 65/1023 | 370/352 |
| 2011/0107379 A1* | 5/2011 | Lajoie | H04L 65/611 | 725/151 |
| 2011/0191810 A1* | 8/2011 | Thomas | H04N 7/106 | 725/78 |
| 2012/0230649 A1* | 9/2012 | Craner | H04N 21/4424 | 386/230 |
| 2013/0198787 A1* | 8/2013 | Perry, II | H04N 21/2585 | 725/86 |
| 2017/0109584 A1* | 4/2017 | Yao | H04N 21/4666 | |
| 2017/0254932 A1* | 9/2017 | Huang | G02F 1/21 | |
| 2018/0150704 A1* | 5/2018 | Lee | G06V 20/58 | |
| 2019/0049302 A1* | 2/2019 | Kim | G01J 3/0256 | |
| 2019/0108618 A1* | 4/2019 | Hwang | G06T 3/4046 | |
| 2019/0222891 A1* | 7/2019 | Shen | H04N 21/25875 | |
| 2020/0025744 A1* | 1/2020 | Tsai | G02B 21/18 | |
| 2020/0196024 A1* | 6/2020 | Hwang | H04N 21/2353 | |
| 2020/0211229 A1* | 7/2020 | Hwang | G06N 3/04 | |
| 2021/0326690 A1* | 10/2021 | P?gard | G06N 3/0675 | |
| 2022/0004007 A1 | 1/2022 | Bhakta | | |
| 2023/0043791 A1* | 2/2023 | Supikov | G03H 1/0866 | |
| 2023/0205133 A1* | 6/2023 | Matusik | G03H 1/04 | 359/9 |
| 2023/0368012 A1* | 11/2023 | Yu | G02B 5/18 | |

* cited by examiner

US 12,206,836 B1

POLARIZATION-BASED OPTICAL ARRANGEMENT WITH VIRTUAL DISPLAYS AND MULTIPLE FIELDS OF VIEW

INTRODUCTION

The present disclosure relates to a polarization-based optical arrangement with virtual displays and multiple fields of view.

A virtual image or display may be presented by a visual output device as a projection of an object or image situated in an outlying or peripheral location so that it appears to be in front of the viewer. An example of virtual imaging is Pepper's Ghost—an illusion technique used in the theatre, cinema, amusement parks, museums, television, and concerts. Virtual imaging is typically used for entertainment (particularly in video games), education (such as in medical or industry training), business (in virtual meetings), and by virtual reality (VR) technologies to create a simulated experience, such as augmented reality and mixed reality.

Currently, realistic imaging is generated either via virtual reality headsets or in multi-projected environments, such as specially designed rooms with multiple large screens. Virtual imaging is frequently accompanied by sounds and other sensations to simulate a user's physical presence in a virtual environment and enhance user experience. For example, virtual reality may incorporate auditory and video feedback, but may also allow other sensory and force feedback through haptic technology. Generally, a person using virtual reality equipment is able to observe, move around, and interact with projected surroundings. However, multiple viewers simultaneously using the same equipment may typically observe the same virtual environment.

SUMMARY

An optical arrangement includes at least one pair of displays. Each pair of displays includes a first display and a second display, wherein each individual display is configured to generate light in a visible spectral range. For each pair of displays, the optical arrangement includes a first polarizer configured to polarize the light incident from the first display and a second polarizer configured to polarize the light incident from the second display. The optical arrangement also includes first and second individual polarizing beam splitters for each pair of displays. Each of the first and second polarizing beam splitters is configured to receive the polarized light from the first and second polarizers. Each of the first and second polarizing beam splitters is also configured to reflect one of an s-polarized component and a p-polarized component of the received polarized light into at least one field of view (FOV) and transmit the other of the s-polarized component and the p-polarized component of the received polarized light into the FOV(s).

The optical arrangement may include multiple pairs of first and second displays configured to simultaneously project multiple virtual images into multiple FOV's for viewing by multiple opposingly situated observers.

In the multiple pairs of first and second displays, each display of one pair of displays may be arranged facing one display of another pair of displays. In such an embodiment, one of the respective first and second individual polarizing beam splitters may be arranged between each two facing displays.

Each of the respective first and second individual polarizing beam splitters may be arranged at an equivalent angle relative to each of the two facing displays.

In one embodiment of the optical arrangement, each of the first and second polarizing beam splitters may be configured to reflect one similarly polarized component of the respective received polarized light and transmit the other similarly polarized component of the respective polarized light into one or more FOV's.

Each of the first and second polarizing beam splitters may be configured to reflect the s-polarized component of the polarized light and transmit the p-polarized component of the polarized light into one or more FOV's.

For each pair of displays, the optical arrangement may additionally include a half-wave plate arranged between the first and second polarizing beam splitters. The half-wave plate may be configured to rotate by 90 degrees polarization of the light polarized by one of the first and second polarizing beam splitters to facilitate transmission of the rotated polarized light through the other of the first and second polarizing beam splitters.

For each pair of displays, each of the first polarizing beam splitter, the second polarizing beam splitter, and the half-wave plate may be arranged on a common axis. Furthermore, the half-wave plate may be offset from a halfway point between the first and second polarizing beam splitters.

In another embodiment of the optical arrangement, the first polarizing beam splitter may be configured to receive polarized light from the first polarizer and reflect one of the s-polarized and the p-polarized component of the polarized light into one or more FOV's. In such an embodiment, the second polarizing beam splitter may be configured to receive polarized light from the second polarizer and reflect the other of the s-polarized and the p-polarized component of the polarized light into one or more FOV's.

For each pair of displays, each of the first and second polarizing beam splitters may be a transparent element.

A motor vehicle may include such an optical arrangement. The optical arrangement may be mounted in the vehicle's passenger compartment enabling multiple vehicle passengers to simultaneously observe various independent images.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
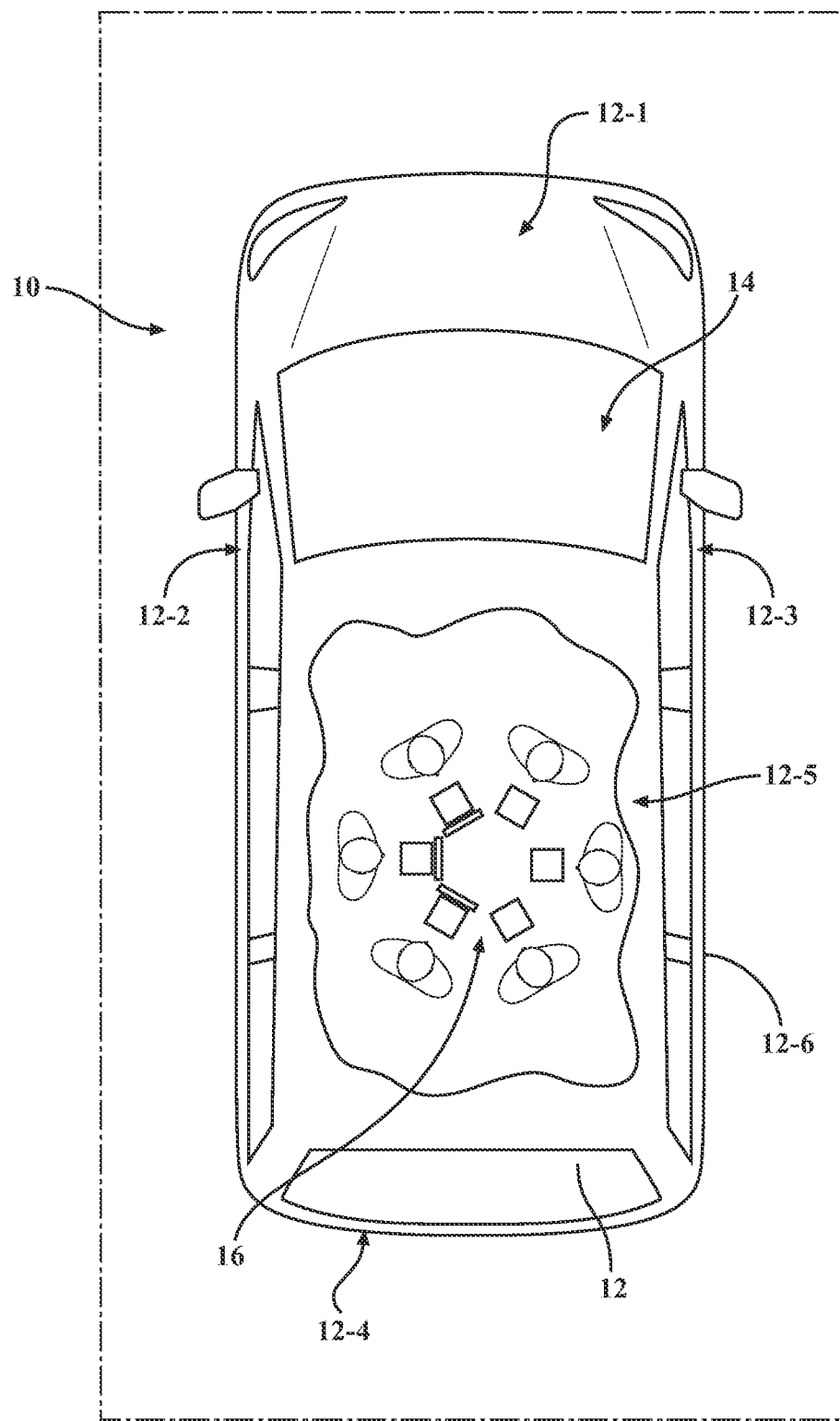
FIG. 1 is a plan view of a motor vehicle having an optical arrangement mounted in the vehicle passenger compartment, according to the present disclosure.

Referring to the drawings, wherein like reference numbers refer to like components, FIG. 1 shows a schematic view of a motor vehicle 10. The motor vehicle 10 may include, but not be limited to, a commercial vehicle, industrial vehicle, passenger vehicle, aircraft, watercraft, train or the like. It is also contemplated that the motor vehicle 10 may be a mobile platform, such as an airplane, all-terrain vehicle (ATV), boat, personal movement apparatus, robot and the like to accomplish the purposes of this disclosure. The motor vehicle 10 includes a vehicle body 12. As shown, the vehicle body 12 may have a leading side or front end 12-1, a left body side 12-2, right body side 12-3, a trailing side or back end 12-4, a top side or section, such as a roof, 12-5, and a bottom side or undercarriage 12-6. The body sides 12-1 through 12-6 generally define and enclose a vehicle interior, including a passenger compartment 14, as well as cargo and powertrain compartments (not shown).

As shown in FIG. 1, the motor vehicle 10 includes an optical arrangement 16 positioned within the passenger compartment 14. The optical arrangement 16 is configured as a system of cooperating optical elements to be described in detail below. Although the optical arrangement 16 is specifically shown in the context of the motor vehicle 10, nothing precludes the subject optical arrangement from being used in another, non-mobile environment, such as inside a building structure. The optical arrangement 16 is intended to permit multiple observers positioned across from one another in close quarters, e.g., office or vehicle space, to view individual and distinct virtual images, while also being able to see one another over or through such images. The disclosed optical arrangement 16 may thereby facilitate sustained eye contact and/or conversation between the observers, without necessitating interruption in the viewing of virtual images.

Figure 2A:
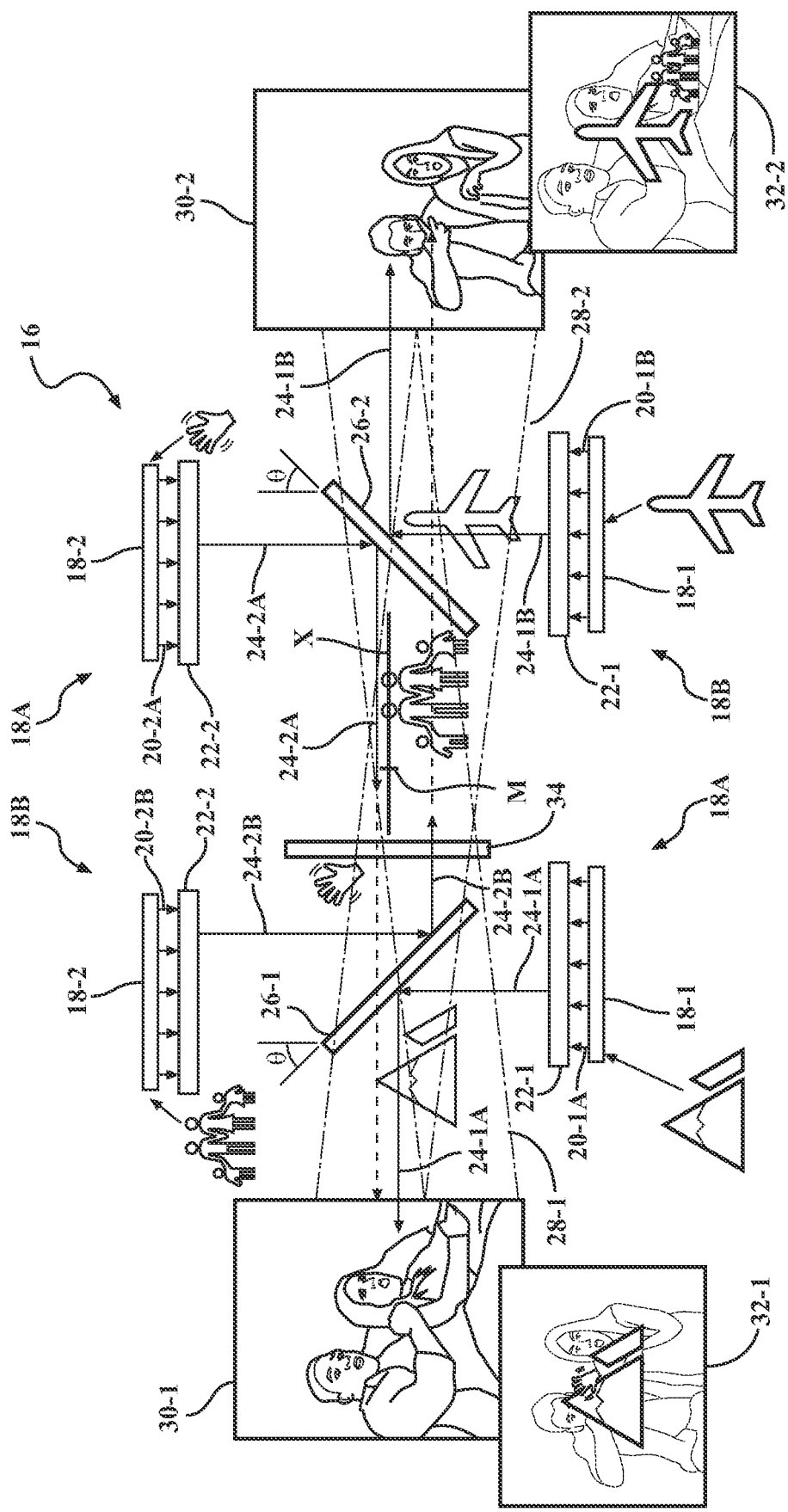
FIG. 2A is an enlarged schematic partial cross-sectional view of an embodiment of the optical arrangement shown in FIG. 1, including optical devices for simultaneously projecting multiple virtual images into distinct FOV's for viewing by multiple observers, and illustrating paths of incident light, according to the present disclosure.
Figure 3A:
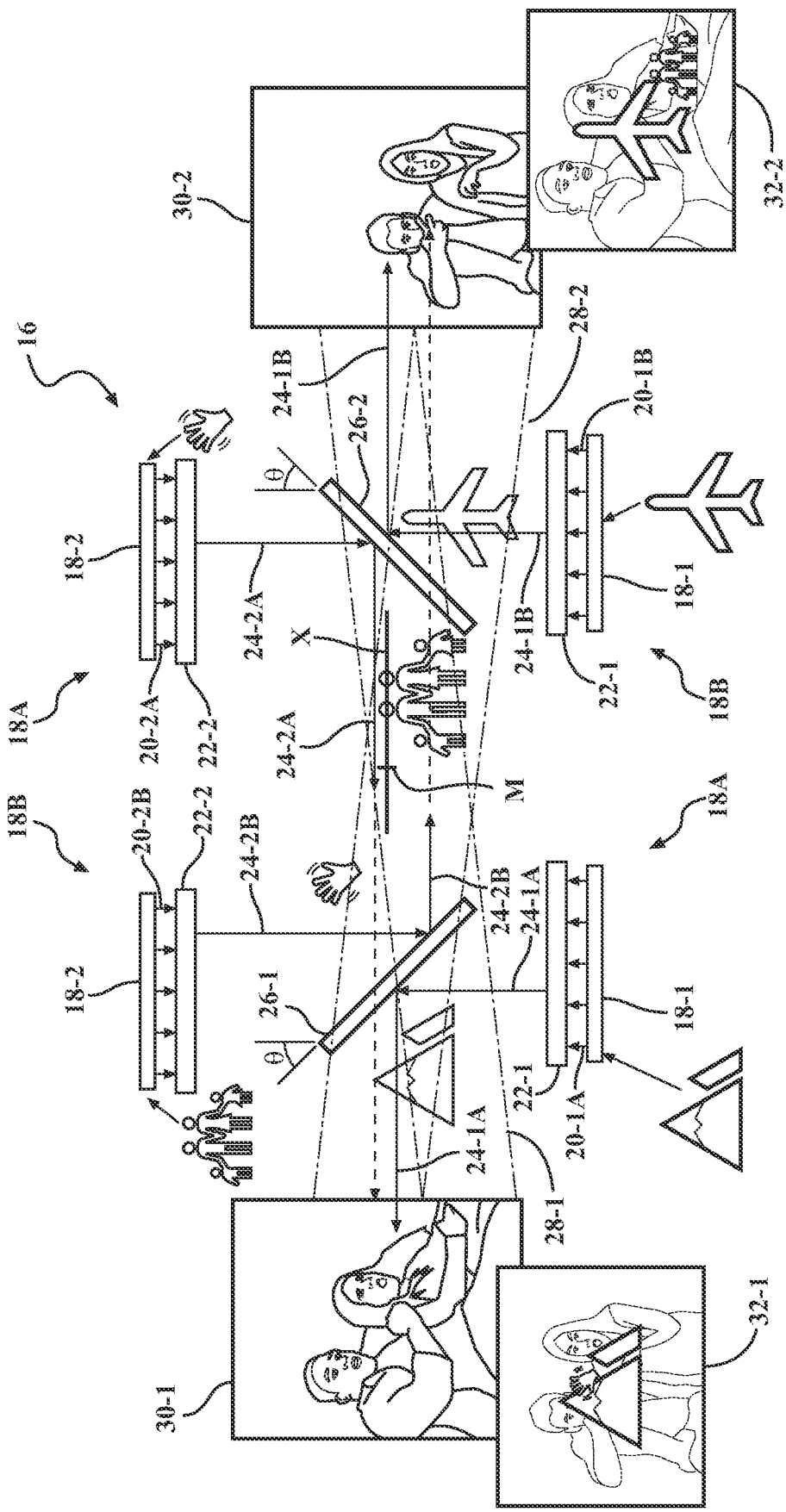
FIG. 3A is an enlarged schematic partial cross-sectional view of another embodiment of the optical arrangement shown in FIG. 1, including optical devices for simultaneously projecting multiple virtual images into distinct FOV's for viewing by multiple observers, and illustrating paths of incident light, according to the present disclosure.

The optical arrangement 16 includes one or more pairs of display channels or displays, shown in FIGS. 2A and 3A as a first pair 18A and a second pair 18B of display channels. Although two pairs of display channels are shown, nothing precludes the optical arrangement from having a greater number of such display pairs. Each display pair 18A, 18B includes a first display 18-1 and a second display 18-2. As shown, each individual display 18-1, 18-2 in each pair 18A, 18B is configured to display videos and/or images, e.g., still images, prerecorded videos, and/or live picture and sound received via digital signals, defined by respective light beams 20-1A, 20-2A and 20-1B, 20-2B in a visible spectral range. The displays 18A, 18B may simultaneously display distinct pictures and sounds for viewing by individual observers situated nearby, as will be discussed in detail below.

With continued reference to FIGS. 2A and 3A, for each pair of displays 18A. 18B, the optical arrangement 16 also includes a first polarizer 22-1 in a fixed position relative to the adjacent first display 18-1 and a second polarizer 22-2 in a fixed position relative to the adjacent second display 18-2. Depending on the selected transmitting axis of the respective first and second polarizers 22-1, 22-2 of the display pairs 18A, 18B, the linearly polarized light beams passing through the subject polarizers will include either an s-polarized component or a p-polarized component of the respective incident light 20-1A, 20-2B in the visible spectral range, while absorbing the other. In the embodiment shown in FIG. 2A, each of the polarizers 22-1, 22-2 generates similarly polarized light, while in the embodiment shown in FIG. 3A, the polarizers 22-1, 22-2 of different display pairs 18A. 18B generate dissimilarly polarized light.

In the first display pair 18A, the first polarizer 22-1 is configured to polarize light 20-1A incident from the first display 18-1 to generate a first beam of polarized light 24-1A, while the second polarizer 22-2 is configured to polarize light 20-2A incident from the second display 18-2 to generate a second beam of polarized light 24-2A. In the second display pair 18B, the first and second polarizers 22-1, 22-2 similarly polarize the light 20-1B, 20-2B incident from corresponding first and second displays 18-1, 18-2 to generate respective first and second beams of polarized light 24-1B, 24-2B. Although the first and second polarizers 22-1, 22-2 may be selected to transmit either the s-polarized light beam component or the p-polarized light beam component, the polarizers depicted in FIG. 2A transmit respective s-polarized light beam components 24-1A, 24-1B, 24-2A, and 24-2B. Conversely, in the embodiment of FIG. 3A, one of the polarizers 22-1, 22-2 in each pair of displays 18A or 18B is configured to transmit an s-polarized light beam component and the other of the two polarizers in each pair of displays transmits a p-polarized light beam component.

The optical arrangement 16 additionally includes first and second individual polarizing beam splitters or filters 26-1, 26-2, one respective beam splitter for each pair 18A, 18B of displays 18-1, 18-2. Each of the polarizing beam splitters 26-1, 26-2 may be a transparent element active in the visible spectral range of about 380 to 750 nanometers and having an optical coating selected to optimize the splitter's polarization separation performance per wavelength range and incident angle range. The first polarizing beam splitter or filter 26-1 has a particular fixed optical orientation which may be configured to either reflect or transmit the s-polarized component and conversely transmit or reflect a p-polarized light beam component (e.g., 24-1A, 24-2A, 24-2B) for a selected field of view (FOV). The second polarizing beam splitter 26-2 also has an individual fixed optical orientation which may be configured to either reflect or transmit an s-polarized light beam component and conversely transmit or reflect a p-polarized component (e.g., 24-1B. 24-2A, 24-2B) received from the respective polarizers 22-1, 22-2 for the selected FOV.

As generally understood, p-polarized light has an electric field direction parallel to the plane of incidence on a device, and s-polarized light has its electric field oriented perpendicular to that plane. Each of the polarizing beam splitters 26-1, 26-2 is configured to support the visible spectral range over an angle of incidence of light corresponding to the selected FOV, while maintaining its polarization selective behavior. Within the context of the optical arrangement 16, as shown in FIGS. 2A and 3A, each of the first and second polarizing beam splitters 26-1, 26-2 may be configured to receive polarized light, i.e., first and second beams of polarized light 24-1A, 24-2A, 24-1B, 24-2B from each of the first and second polarizers 22-1, 22-2 corresponding to the individual display pairs 18A, 18B.

In each embodiment of the optical arrangement 16 shown respectively in FIGS. 2A and 3A, the first and second polarizing beam splitters 26-1, 26-2 are configured to reflect one of an s-polarized component and a respective p-polarized component of the received polarized light, i.e., corresponding beams of polarized light 24-1A, 24-2A, 24-1B, or 24-2B, into at least one FOV. Specifically, the first and second polarizing beam splitters 26-1, 26-2 reflect either the s-polarized component or the p-polarized component of the respective polarized light beams into a first FOV 28-1 and/or a second FOV 28-2. The first FOV 28-1 and the second FOV 28-2 may correspond to positions of individual observers, shown in FIGS. 2A and 3A as a first observer 30-1 and a second observer 30-2. Furthermore, each of the first and second polarizing beam splitters 26-1, 26-2 is configured to transmit the other of the s-polarized component and the p-polarized component of the received polarized light 24-1A, 24-2A, 24-1B, or 24-2B into the first FOV 28-1 and/or the second FOV 28-2.

With continued reference to both FIGS. 2A and 3A, each of the pairs 18A, 18B of displays 18-1, 18-2 is configured to simultaneously project multiple virtual images into multiple FOV's 28-1, 28-2 for viewing by multiple observers, i.e., the first observer(s) 30-1 and the second observer 30-2. Specifically, the first FOV 28-1 may include a virtual image from the first display 18-1 and also a view of the second observer(s) 30-2, as indicated by a combined image 32-1. Analogously, the second FOV 28-2 may include a virtual image from the second display 18-2 and also a view of first observer 30-1, as indicated by a combined image 32-2. For example, the images from displays 18-1, 18-2 may be superimposed over or otherwise combined with respective views of the observers 30-1, 30-2. As a result, the optical arrangement 16 may create an illusion for the first observer 30-1 that the images from display pairs 18A and 18B are floating over the second observer 30-2, and a likewise illusion for the second observer 30-2 that the image from the display pairs 18A and 18B are floating over the first observer 30-1.

To affect such viewing of virtual images, the first and second observers 30-1, 30-2 would be opposingly situated, e.g., seated opposite of each other, within the passenger compartment 14 or in an analogous non-mobile space. Furthermore, each individual display 18-1, 18-2 of a particular pair of displays, such as pair 18A, may be arranged opposite and facing one display of another pair of displays, e.g., pair 18B. Individual displays 18-1, 18-2 of each display pair 18A, 18B are arranged substantially perpendicular to an axis X extending through the first polarizing beam splitter 26-1 and the second polarizing beam splitter 26-2. The axis X may define an axis of symmetry for the optical arrangement 16 and thereby establish a general direction of the FOV's 28-1 and 28-2, as well as relative positioning for the observers 30-1, 30-2.

As shown in each of FIGS. 2A and 3A, one of the respective first and second individual polarizing beam splitters 26-1, 26-2 is arranged between each two facing displays 18-1, 18-2. The above configuration may be repeated for as many pairs of first and second displays 18-1, 18-2 as desired for the optical arrangement 16. To facilitate simultaneous viewing of multiple images by opposing observers, the first polarizing beam splitter 26-1 may be arranged at the same or equivalent angle θ (45-degrees) relative to each of the two facing displays 18-1, 18-2 of each pair 18A and 18B. As shown, the second polarizing beam splitter 26-2 may be similarly arranged at the same angle θ relative to each of the two corresponding facing displays 18-1, 18-2.

In an embodiment of the optical arrangement 16 shown in FIG. 2A, each of the first and second polarizing beam splitters 26-1, 26-2 is configured to reflect a similarly polarized (either s- or p-) component of the polarized light received from the respective first and second polarizers 22-1, 22-2. In the same embodiment, each of the first and second polarizing beam splitters 26-1, 26-2 is also configured to transmit the other similarly polarized (either p- or s-) polarized component of the respective received polarized light into the corresponding first or second FOV 28-1, 28-2. Specifically, as shown in FIG. 2A, the first polarizing beam splitter 26-1 may be configured to reflect the s-polarized light beam components 24-1A and 24-2B and transmit the p-polarized light beam component 24-2A into the first FOV 28-1. The second polarizing beam splitter 26-1 may be analogously configured to reflect the s-polarized light beam components 24-1B and 24-2A and transmit the p-polarized light beam component 24-2B into the second FOV 28-2.

In the embodiment of FIG. 2A, for each pair of displays, e.g., 18A, 18B, the optical arrangement 16 may additionally include a half-wave plate 34 arranged between the first and second polarizing beam splitters 26-1, 26-2. As shown in FIG. 2A, for each pair of displays, e.g., 18A, 18B, the first polarizing beam splitter 26-1, the second polarizing beam splitter 26-2, and the half-wave plate 34 are arranged on the common axis X. Generally, a half-wave plate is constructed from a birefringent (or birefractive) material configured to rotate polarized light by 90 degrees, i.e., shift polarization direction of linearly polarized light from "s" to "p" or vice versa. Material of such a half-wave plate may, for example, be quartz, mica, or plastic.

Accordingly, each half-wave plate 34 is configured to shift polarization of the polarized light to facilitate transmission of the rotated polarized light (either p- or s-polarized component) through the other of the first and second polarizing beam splitters 26-1, 26-2. In the subject embodiment, the first and second polarizing beam splitters 26-1, 26-2 are configured to reflect and transmit similarly polarized components of light received from their respective first and second polarizers 22-1, 22-2. With the aid of the half-wave plate 34, each of the first and second polarizing beam splitters 26-1, 26-2 is also able to transmit the polarized light component that is reflected in its direction along the axis X from the other beam splitter.

Figure 2B:
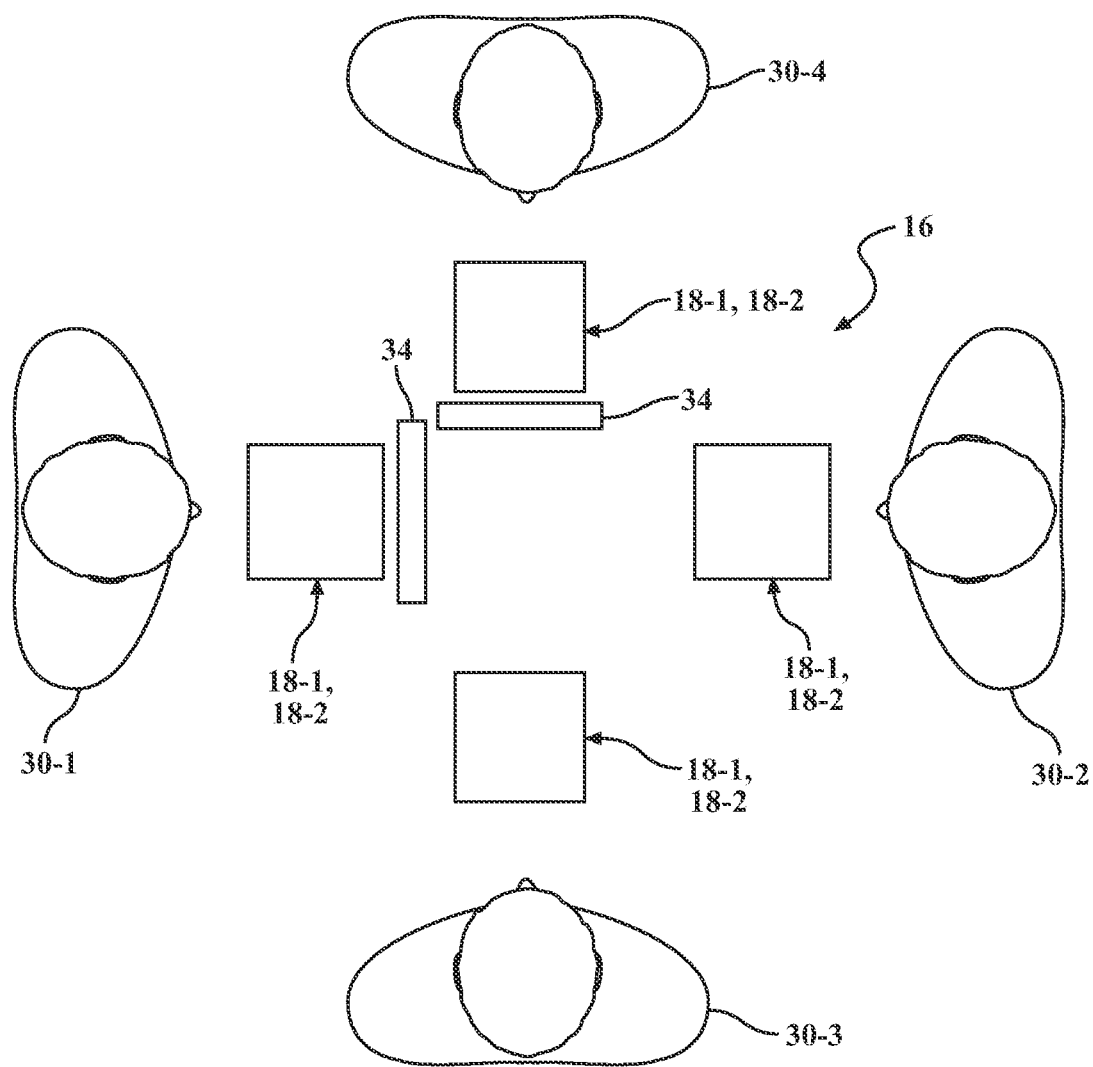
FIG. 2B is an enlarged schematic plan view of the optical arrangement shown in FIG. 2A expanded to include four observers.

As also shown in FIG. 2A, the half-wave plate 34 may be offset from a half or midway point M along the axis X between the first and second polarizing beam splitters 26-1, 26-2 to provide space between the half-way plate and one of the beam splitters for additional pairs of display channels, if so desired. The optical arrangement 16 shown in FIG. 2A permits the images from each or both of the first display 18-1 and the second display 18-2 to be simultaneously projected into the first FOV 28-1 or into the second FOV 28-2. The individual images projected from the first and second displays 18-1, 18-2 may be combined in either the first FOV 28-1 and/or in the second FOV 28-2. The combined images projected into the first FOV 28-1 may be viewed by the first observer 30-1, while the combined images projected into the second FOV 28-2 may be simultaneously viewed by the second observer 30-2. Additionally, since the first and second observers 30-1, 30-2 are situated across from one another, these observers may also see and be able to communicate with each other while viewing the images projected from the first and second displays 18-1, 18-2. The above format may be replicated for each additional pair of observers situated around the optical arrangement 16 in complementary FOV's. Consequently, the subject optical arrangement 16 may be expanded to include as many multiples of observer pairs as permitted by the subject enclosed space, specifically depicted in FIG. 2B as accommodating four individual observers 30-1, 30-2, 30-3, and 30-4.

FIG. 3A depicts an alternative embodiment of the optical arrangement 16. In the alternative embodiment of the optical arrangement 16, the first polarizing beam splitter 26-1 is configured to receive polarized light 24-1A from the first polarizer 22-1 and reflect either the s-polarized component 24-1A or the p-polarized component 24-1B of the polarized light into the FOV 28-1 and/or FOV 28-2. On the other hand, the second polarizing beam splitter 26-2 in FIG. 3A is configured to receive polarized light from the second polarizer 22-2 and reflect the other of the s-polarized component 24-2A and the p-polarized component 24-2B of the polarized light into the FOV 28-1 and/or FOV 28-2. In other words, the first and second polarizing beam splitters 26-1, 26-2 are configured to reflect and transmit oppositely polarized components of light received from their respective first and second polarizers 22-1, 22-2. Accordingly, each of the first and second polarizing beam splitters 26-1, 26-2 is able to additionally transmit the polarized light component that is reflected in its direction along the axis X from the other beam splitter.

Figure 3B:
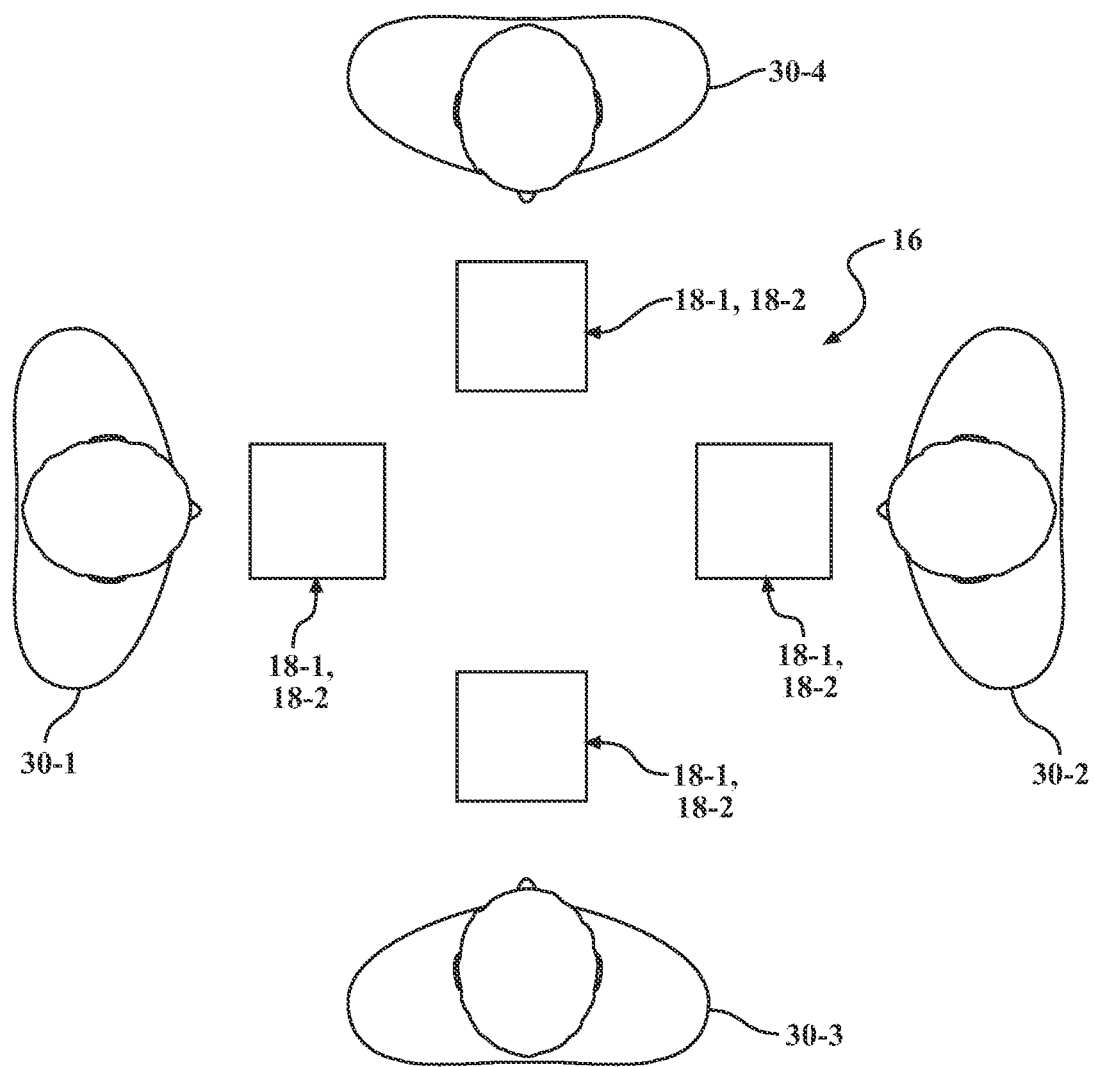
FIG. 3B is an enlarged schematic plan view of the optical arrangement shown in FIG. 3A expanded to include four observers.

Similar to the optical arrangement 16 shown in FIG. 2A, the arrangement in FIG. 3A permits the images from each or both of the first display 18-1 and the second display 18-2 to be simultaneously projected into the first FOV 28-1 or into the second FOV 28-2. The combined images projected into the first FOV 28-1 may likewise be viewed by the first observer 30-1, while the combined images projected into the second FOV 28-2 may be viewed by the second observer 30-2. The first and second observers 30-1, 30-2 are in each other's line of sight, thus being able to communicate while simultaneously viewing the images projected from the first and second displays 18-1, 18-2. Furthermore, same as with the optical arrangement 16 shown in FIG. 2A, the optical arrangement in FIG. 3A may be expanded and replicated for each additional pair of observers situated around the optical elements in complementary FOV's. For example, the subject optical arrangement 16 may accommodate four individual observers 30-1, 30-2, 30-3, and 30-4 (or greater) as depicted in FIG. 3B.

Overall, in the optical arrangement 16 shown in FIG. 2A, each of the first and second polarizing beam splitters 26-1, 26-2 reflect and transmit similarly polarized light (respective s- or p-polarized components 24-1A, 24-2A or 24-1B, 24-2B) and employ the half-wave plate 34 to shift light polarization between two beam splitters. On the other hand, in the embodiment of FIG. 3A, the first and second polarizing beam splitters 26-1, 26-2 reflect oppositely polarized light (e.g., if the first polarizing beam splitter 26-1 transmits the s-polarized component, the second polarizing beam splitter 26-2 transmits the p-polarized component), thereby not requiring polarization direction of light to be shifted therebetween, e.g., via a half-way plate.

Either of the two described embodiments of the optical arrangement 16 facilitate multiple observers positioned across from one another in close quarters to view distinct virtual images, while also being able to see and communicate with one another over or through such images. The optical arrangement 16 is a system of cooperating stationary optical elements relative to the enclosed space, such as the passenger compartment 14 of the vehicle 10. The imaging displays are employed in pairs and positioned orthogonally relative to the FOV's. Consequently, positioning of optical elements in the optical arrangement 16 define specific locations for individual observers from which multiple virtual images and each observer's counterpart may be viewed simultaneously. Although the optical arrangement 16 may be employed in non-mobile environments as well as in motor vehicles, the optical arrangement may be particularly useful in the context of ridesharing and taxi applications.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. An optical arrangement comprising:
   at least one pair of displays, wherein each pair of displays includes a first display and a second display, and wherein each individual display is configured to generate light in a visible spectral range;
   for each pair of displays, a first polarizer configured to polarize the light incident from the first display and a second polarizer configured to polarize the light incident from the second display; and
   first and second individual polarizing beam splitters for each pair of displays, wherein each of the first and second polarizing beam splitters is configured to receive the polarized light from the first and second polarizers and reflect one of an s-polarized component and a p-polarized component of the received polarized light into at least one field of view (FOV) and transmit the other of the s-polarized component and the p-polarized component of the received polarized light into the at least one FOV.

2. The optical arrangement according to claim 1, wherein the at least one pair of displays includes multiple pairs of first and second displays configured to simultaneously project multiple virtual images into multiple FOV's for viewing by multiple opposingly situated observers.

3. The optical arrangement according to claim 2, wherein:
   in the multiple pairs of first and second displays, each display of one pair of displays is arranged facing one display of another pair of displays; and
   one of the respective first and second individual polarizing beam splitters is arranged between each two facing displays.

4. The optical arrangement according to claim 3, wherein each of the respective first and second individual polarizing beam splitters is arranged at an equivalent angle relative to each of the two facing displays.

5. The optical arrangement according to claim 1, wherein each of the first and second polarizing beam splitters is configured to reflect one similarly polarized component of the respective received polarized light and transmit the other similarly polarized component of the respective polarized light into the at least one FOV.

6. The optical arrangement according to claim 5, wherein each of the first and second polarizing beam splitters is configured to reflect the s-polarized component of the polarized light and transmit the p-polarized component of the polarized light into the at least one FOV.

7. The optical arrangement according to claim 6, further comprising, for each pair of displays, a half-wave plate arranged between the first and second polarizing beam splitters and configured to rotate by 90 degrees polarization of the light polarized by one of the first and second polarizing beam splitters to facilitate transmission of the rotated polarized light through the other of the first and second polarizing beam splitters.

8. The optical arrangement according to claim 7, wherein, for each pair of displays, each of the first polarizing beam splitter, the second polarizing beam splitter, and the half-wave plate is arranged on a common axis, and wherein the half-wave plate is offset from a halfway point between the first and second polarizing beam splitters.

9. The optical arrangement according to claim 1, wherein:
the first polarizing beam splitter is configured to receive polarized light from the first polarizer and reflect one of the s-polarized and the p-polarized component of the polarized light into the at least one FOV; and
the second polarizing beam splitter is configured to receive polarized light from the second polarizer and reflect the other of the s-polarized and the p-polarized component of the polarized light into the at least one FOV.

10. The optical arrangement according to claim 1, wherein, for each pair of displays, each of the first and second polarizing beam splitters is a transparent element.

11. A motor vehicle comprising:
a vehicle body defining a passenger compartment; and
an optical arrangement positioned within the passenger compartment and including:
at least one pair of displays, wherein each pair of displays includes a first display and a second display, and wherein each individual display is configured to generate light in a visible spectral range;
for each pair of displays, a first polarizer configured to polarize the light incident from the first display and a second polarizer configured to polarize the light incident from the second display; and
first and second individual polarizing beam splitters for each pair of displays, wherein each of the first and second polarizing beam splitters is configured to receive the polarized light from the first and second polarizers and reflect one of an s-polarized component and a p-polarized component of the received polarized light into at least one field of view (FOV) and transmit the other of the s-polarized component and the p-polarized component of the received polarized light into the at least one FOV.

12. The motor vehicle according to claim 11, wherein the at least one pair of displays includes multiple pairs of first and second displays configured to simultaneously project multiple virtual images into multiple FOV's for viewing by multiple observers opposingly situated within the passenger compartment.

13. The motor vehicle according to claim 12, wherein:
in the multiple pairs of first and second displays, each display of one pair of displays is arranged facing one display of another pair of displays; and one of the respective first and second individual polarizing beam splitters is arranged between each two facing displays.

14. The motor vehicle according to claim 13, wherein each of the respective first and second individual polarizing beam splitters is arranged at an equivalent angle relative to each of the two facing displays.

15. The motor vehicle according to claim 11, wherein each of the first and second polarizing beam splitters is configured to reflect one similarly polarized component of the respective received polarized light and transmit the other similarly polarized component of the respective polarized light into the at least one FOV.

16. The motor vehicle according to claim 15, wherein each of the first and second polarizing beam splitters is configured to reflect the s-polarized component of the polarized light and transmit the p-polarized component of the polarized light into the at least one FOV.

17. The motor vehicle according to claim 16, wherein, for each pair of displays, the optical arrangement additionally includes a half-wave plate arranged between the first and second polarizing beam splitters and configured to rotate by 90 degrees polarization of the light polarized by one of the first and second polarizing beam splitters to facilitate transmission of the rotated polarized light through the other of the first and second polarizing beam splitters.

18. The motor vehicle according to claim 17, wherein, for each pair of displays, each of the first polarizing beam splitter, the second polarizing beam splitter, and the half-wave plate is arranged on a common axis, and wherein the half-wave plate is offset from a halfway point between the first and second polarizing beam splitters.

19. The motor vehicle according to claim 11, wherein:
the first polarizing beam splitter is configured to receive polarized light from the first polarizer and reflect one of the s-polarized and the p-polarized component of the polarized light into the at least one FOV; and
the second polarizing beam splitter is configured to receive polarized light from the second polarizer and reflect the other of the s-polarized and the p-polarized component of the polarized light into the at least one FOV.

20. A motor vehicle comprising:
a vehicle body defining a passenger compartment; and
an optical arrangement positioned within the passenger compartment and including:
multiple pairs of first and second displays configured to simultaneously project multiple virtual images into multiple fields of view (FOV's) for viewing by multiple observers opposingly situated within the passenger compartment, wherein each pair of displays includes a first display and a second display, and wherein each individual display is configured to generate light in a visible spectral range;
for each pair of displays, a first polarizer configured to polarize the light incident from the first display and a second polarizer configured to polarize the light incident from the second display; and
first and second individual polarizing beam splitters for each pair of displays, wherein each of the first and second polarizing beam splitters is configured to receive the polarized light from the first and second polarizers and reflect one of an s-polarized component and a p-polarized component of the received polarized light into the multiple FOV's and transmit the other of the s-polarized component and the p-polarized component of the received polarized light into the multiple FOV's.

\* \* \* \* \*